US010763953B2

(12) United States Patent
Liu et al.

(10) Patent No.: US 10,763,953 B2
(45) Date of Patent: Sep. 1, 2020

(54) AERIAL-BASED COMMUNICATION SYSTEM

(71) Applicant: SCHLUMBERGER TECHNOLOGY CORPORATION, Sugar Land, TX (US)

(72) Inventors: Cen Liu, Sugar Land, TX (US); Aman Verma, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/938,048

(22) Filed: Nov. 11, 2015

(65) Prior Publication Data

US 2017/0134086 A1     May 11, 2017

(51) Int. Cl.
    *H04B 7/185*     (2006.01)
(52) U.S. Cl.
    CPC .............................. *H04B 7/18502* (2013.01)
(58) Field of Classification Search
    CPC .................................................. H04B 7/18502
    See application file for complete search history.

(56) References Cited

U.S. PATENT DOCUMENTS

| | | | |
|---|---|---|---|
| 6,383,077 B1 | 5/2002 | Kweitko et al. | |
| 8,065,342 B1 | 11/2011 | Borg et al. | |
| 9,563,201 B1* | 2/2017 | Tofte | G05D 1/0038 |
| 10,163,065 B1 | 12/2018 | Koski et al. | |
| 2006/0122865 A1 | 6/2006 | Preiss et al. | |
| 2009/0024442 A1 | 1/2009 | Brink et al. | |
| 2009/0076878 A1 | 3/2009 | Woerner et al. | |
| 2011/0144828 A1* | 6/2011 | Chengalva | F41H 7/005 701/2 |
| 2012/0166022 A1* | 6/2012 | Kwon | G05D 1/0044 701/2 |
| 2012/0203589 A1 | 8/2012 | Eggena et al. | |
| 2013/0339969 A1 | 12/2013 | Koski et al. | |
| 2014/0131510 A1* | 5/2014 | Wang | B64C 27/00 244/17.23 |
| 2014/0204121 A1* | 7/2014 | Whitley | G06T 11/00 345/633 |
| 2015/0090496 A1 | 4/2015 | Rempe et al. | |
| 2015/0100235 A1 | 4/2015 | Jones et al. | |
| 2015/0100503 A1 | 4/2015 | Lobo et al. | |
| 2015/0192437 A1 | 7/2015 | Bouzas et al. | |
| 2015/0319769 A1 | 11/2015 | Grabowsky et al. | |

(Continued)

FOREIGN PATENT DOCUMENTS

WO     2015086331 A1     6/2015

OTHER PUBLICATIONS

International Search Report and Written Opinion issued in International Patent Application No. PCT/US2016/060878 dated Feb. 16, 2017; 18 pages.

*Primary Examiner* — Bobbak Safaipour
(74) *Attorney, Agent, or Firm* — Cathy Hewitt

(57) ABSTRACT

Methods and apparatus pertaining to positioning an aerial mobile communication vehicle over one of a plurality of sectors of a job site. A control center is associated with the job site. The aerial mobile communication vehicle is able to communicate with a communication device in the one sector. Data is communicated between the control center and the communication device via the aerial mobile communication vehicle.

20 Claims, 7 Drawing Sheets

(56) References Cited

U.S. PATENT DOCUMENTS

| | | | |
|---|---|---|---|
| 2015/0326398 A1* | 11/2015 | Modarresi | H04L 9/32 |
| | | | 713/181 |
| 2015/0379457 A1 | 12/2015 | Jackson | |
| 2016/0012730 A1* | 1/2016 | Jarrell | G08G 5/003 |
| | | | 701/8 |
| 2016/0028471 A1* | 1/2016 | Boss | H04W 28/0289 |
| | | | 455/406 |
| 2016/0144959 A1* | 5/2016 | Meffert | B64C 39/024 |
| | | | 701/3 |
| 2016/0203434 A1 | 7/2016 | Sivakumar et al. | |
| 2017/0109684 A1* | 4/2017 | Liu | G06Q 10/063114 |

* cited by examiner

AERIAL-BASED COMMUNICATION SYSTEM

BACKGROUND OF THE DISCLOSURE

Operations performed at job sites such as oilfield wellsites may include operations such as drilling, cementing, acidizing, water-jet cutting, and hydraulic fracturing of subterranean formations, among other examples, and are often physically distributed over a substantial and changing area. To perform various wellsite field operations, reliable communication among field workers and equipment is necessary to maintain a trouble-free operational status. As wellsite technology is transformed into the digital age, providing a reliable local area network for such communication has become a challenging task in view of the limited power and communication range of many on-site monitoring and communication devices. Previous techniques of using wired and local wireless communication means such as Bluetooth may not provide an adequate level of connectivity for communication over the variable area occupied by a wellsite. With current wireless systems, a substantial level of interference can be introduced. For example, physical obstructions can substantially block wireless communication. Offshore facilities can present other communication challenges in view of an absence of nearby offshore wireless facilities. Additionally, direct visual observation of equipment at the wellsite and communication of observed images, particularly on a continuous monitoring basis, is generally not practical with the present wireless communication systems.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes positioning an aerial mobile communication vehicle over one of several sectors of a job site. A control center is associated with the job site, and the aerial mobile communication vehicle is able to communicate with a communication device in the one sector. The method also includes communicating data between the control center and the communication device via the aerial mobile communication vehicle.

The present disclosure also introduces an aerial mobile communication vehicle that includes a processor and a memory including computer program code. The processor, the memory, and the computer program code are collectively operable to cause the aerial mobile communication vehicle to receive instructions for positioning the aerial mobile communication vehicle over one of several sectors at a job site, and communicate data between a control center associated with the job site and a communication device within the one sector.

The present disclosure also introduces an apparatus in communication with an aerial mobile communication vehicle at a job site. The apparatus includes a processor and a memory including computer program code. The processor, the memory, and the computer program code are collectively operable to cause the apparatus to provide instructions for positioning the aerial mobile communication vehicle over a sector of the job site, and provide control information to direct the aerial mobile communication vehicle to communicate data between a control center and a communication device within the sector.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
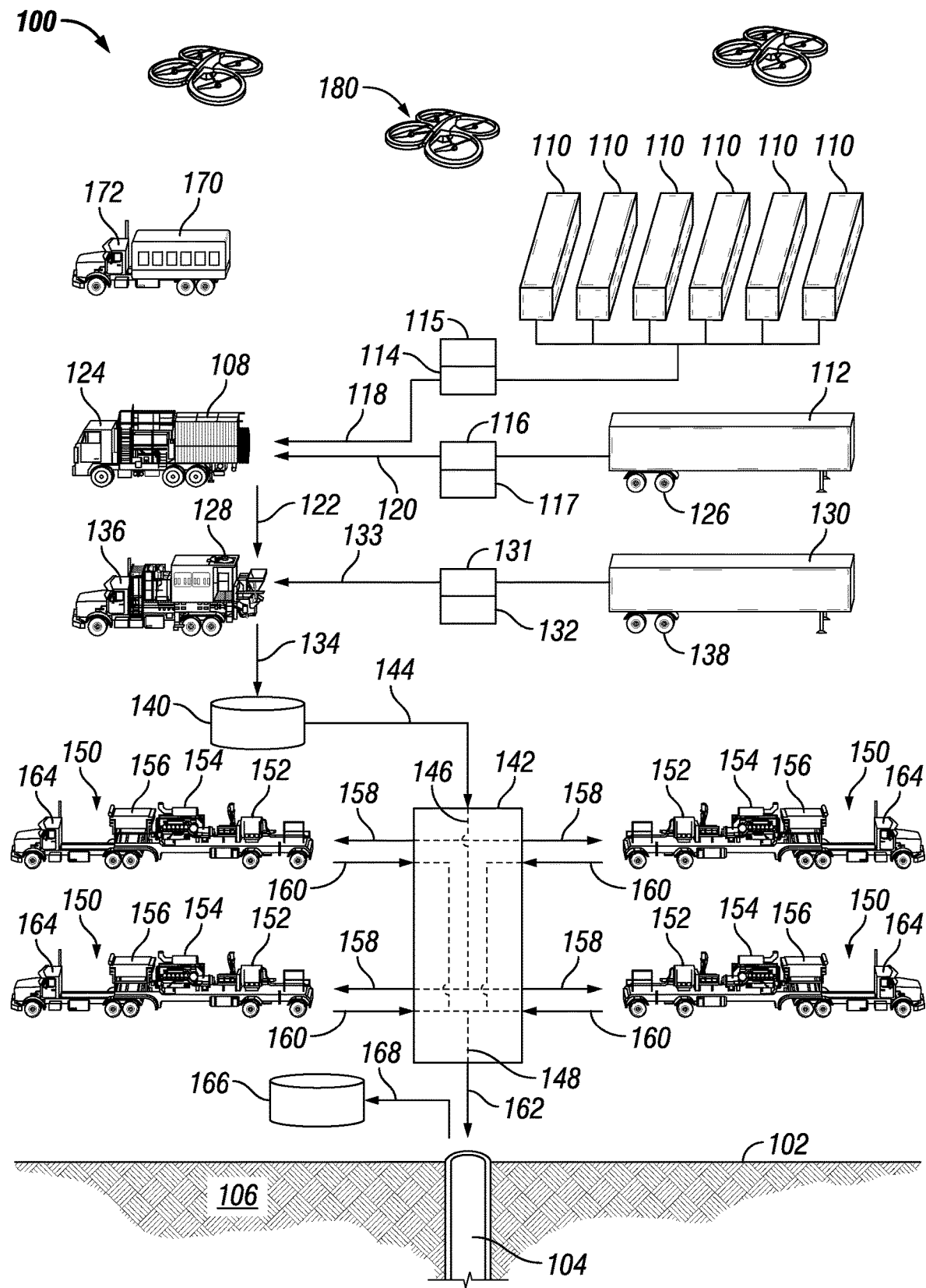
FIG. 1 is a schematic view of at least a portion of an example implementation of an additive system at an oilfield wellsite that provides an example environment for a communication system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

As introduced herein, an ad hoc communication system formed with aerial mobile communication vehicles provides both unidirectional and bidirectional wireless communication between communication devices and personnel deployed at a job site, such as an operational facility (e.g., a wellsite). The communication devices deployed at the operational facility can include, without limitation, smart glasses and tablet computers (referred to hereafter as "tablets") associated with field equipment operated by field personnel (or workers), as well as monitoring devices such as temperature, pressure, and chemical sensors equipped with wireless communication capability. Communication can be provided by the aerial mobile communication vehicles between a supervisor at a control center of an oilfield wellsite and personnel and monitoring devices at the operational facility. Context-aware information including visual images enhanced by augmented reality for operation of the wellsite is provided to and from the various monitoring devices and personnel, both on-site and off-site.

The communication system may be utilized with various types of physical equipment such as equipment at an oilfield wellsite or at other job sites such as, without limitation, a manufacturing facility and a construction site. In an oilfield environment, the physical equipment can be located at a wellsite that can be either onshore or offshore, stationed at an oilfield base facility, undergoing or awaiting repair at a maintenance shop, and/or being transported between the wellsite and the base facility.

FIG. 1 is a schematic view of at least a portion of an example implementation of an additive system 100 at an oilfield wellsite that provides an example environment for a communication system according to one or more aspects of the present disclosure. The figure depicts a wellsite surface 102 adjacent to a wellbore 104 and a partial sectional view of a subterranean formation 106 penetrated by the wellbore 104 below the wellsite surface 102. The additive system 100 may be operable to transfer an additive or other material from a source location to a destination location for blending or mixing with another additive or material and eventual injection into the wellbore 104. The additive system 100 may comprise a first mixer 108 connected with one or more first containers 110 and a second container 112. The second container 112 may contain a first additive and the first containers 110 may contain water or another liquid comprising water. When the additive system 100 is operable as a fracturing system, the first additive may be or comprise a hydratable material or gelling agent, such as guar, a polymer, a synthetic polymer, a galactomannan, a polysaccharide, a cellulose, and/or a clay, among other examples, and the liquid may be or comprise an aqueous fluid, which may comprise water or an aqueous solution comprising water, among other examples. When the additive system 100 is operable as a cementing system, the first additive may be or comprise cement powder.

The liquid may be transferred from the first containers 110 to the first mixer 108 by a first material transfer device 114, such as may be driven by a first prime mover 115. The first material transfer device 114 may be or comprise a pump, while the prime mover 115 may be or comprise an electric motor, an engine, or another rotary actuator. The first additive may be transferred from the second container 112 to the first mixer 108 by a second material transfer device 116, such as may be driven by a second prime mover 117. The second material transfer device 116 may be or comprise a conveyer, a bucket elevator, or a feeding screw, while the second prime mover 117 may be or comprise an electric motor, an engine, or another rotary actuator. The first mixer 108 may be operable to receive the first additive and the liquid via two or more conduits 118, 120, and mix or otherwise combine the first additive and the liquid to form a base fluid. The first mixer 108 may then discharge the base fluid via one or more conduits 122.

The first mixer 108 and the second container 112 may each be disposed on corresponding trucks, trailers, and/or other mobile carriers 124, 126, respectively, to permit their transportation to the wellsite surface 102. However, the first mixer 108 and/or second container 112 may be skidded or otherwise stationary, and/or may be temporarily or permanently installed at the wellsite surface 102.

The additive system 100 may further comprise a second mixer 128 fluidly connected with the first mixer 108 and a third container 130. The third container 130 may contain a second additive that may be substantially different than the first additive. When the additive system 100 is operable as the fracturing system, the second additive may be or comprise a proppant material, such as sand, sand-like particles, silica, quartz, and/or propping agents, among other examples. When the additive system 100 is operable as the cementing system, the second additive may be or comprise accelerators, retarders, fluid-loss additives, dispersants, extenders, weighting agents, lost circulation additives and/or other chemicals or materials operable to modify the characteristics of the base fluid. The second additive may be a solid material (e.g., particulate material, powder) or a liquid.

The second additive may be transferred from the third container 130 to the second mixer 128 by a third material transfer device 131 driven by a third prime mover 132. The third material transfer device 131 may be or comprise a pump when the second additive is a liquid, or the third material transfer device 131 may be or comprise a conveyer, a bucket elevator, or a feeding screw when the second additive is a solid material. The third prime mover 132 may be or comprise an electric motor, an engine, or another rotary actuator. The second mixer 128 may be operable to receive the base fluid from the first mixer 108 via one or more conduits 122, and a second additive from the third container 130 via one or more conduits 133, and mix or otherwise combine the base fluid and the second additive to form a mixture. The mixture may comprise a fracturing fluid when the additive system 100 is operable as the fracturing system, or the mixture may comprise a cement slurry when the additive system 100 is operable as the cementing system. The second mixer 128 may then discharge the mixture via one or more conduits 134.

The second mixer 128 and the third container 130 may each be disposed on corresponding trucks, trailers, and/or other mobile carriers 136, 138, respectively, to permit their transportation to the wellsite surface 102. However, the second mixer 128 and/or third container 130 may be skidded or otherwise stationary, and/or may be temporarily or permanently installed at the wellsite surface 102.

The mixture may be communicated from the second mixer 128 to a fourth container 140, which may be or comprise a mixing, displacement, or storage tank for the mixture prior to being injected into the wellbore 104. The mixture may be communicated from the fourth container 140 to a common manifold 142 via the one or more conduits 144. The common manifold 142 may comprise a combination of valves and/or diverters, as well as a suction line 146 and a discharge line 148, such as may be collectively operable to direct flow of the mixture in a selected or predetermined manner. The common manifold 142, which may be known in the art as a missile or a missile trailer, may distribute the mixture to a pump fleet. The pump fleet may comprise multiple pump assemblies 150 each comprising a pump 152, a prime mover 154, and a heat exchanger 156. Each pump assembly 150 may receive the mixture from the suction line 146 of the common manifold 142, via one or more conduits 158, and discharge the mixture under pressure to the discharge line 148 of the common manifold 142, via one or more conduits 160.

The pump assemblies 150 may each be mounted on corresponding trucks, trailers, and/or other mobile carriers 164, such as may permit their transportation to the wellsite surface 102. However, the pump assemblies 150 may be skidded or otherwise stationary, and/or may be temporarily or permanently installed at the wellsite surface 102.

The mixture may then be discharged from the common manifold 142 into the wellbore 104 via one or more conduits 162, such as may include various valves, conduits, and/or other hydraulic circuitry fluidly connected between the common manifold 142 and the wellbore 104. During operations, the mixture and/or wellbore fluid may be ejected from the wellbore 104 and communicated to a fifth container 166 via one or more conduits 168. Although the additive system 100 is shown comprising a fourth container 140, it is to be understood that the fourth container 140 may not be included as part of the additive system 100, such that the mixture may be communicated from the second mixer 128 directly to the common manifold 142. The additive system 100 may also omit the common manifold 142, and the conduits 160 may be fluidly connected to the wellbore 104 via a wellhead (not shown) and/or other means.

The additive system 100 may also comprise a control center 170, which may be operable to monitor and control at least a portion of the additive system 100 during operations. Signals may be communicated between the control center 170 and other components of the additive system 100 via a communication system including a plurality of aerial mobile communication vehicles (one of which is designated 180). For example, the control center 170 may be operable to monitor and/or control the production rate of the mixture, such as by increasing or decreasing the flow of the liquid from the first containers 110, the first additive from the second container 112, the base fluid from the first mixer 108, the second additive from the third container 130, and/or the mixture from the second mixer 128. The control center 170 may also be operable to monitor health and/or functionality of the additive system 100. For example, the control center 170 may be operable to monitor and/or control operational parameters associated with the containers 110, 112, 130, 140, 166, the first and second mixers 108, 128, the material transfer devices 114, 116, 131, and/or the pump assemblies 150. The control center 170 may also be operable to monitor temperature, viscosity, density, and composition of the liquid contained in the first containers 110, the first additive, the second additive, and/or the mixture. The control center 170 may also communicate with communication devices to allow a supervisor to assign tasks to field personal to operate the additive system 100, or portions thereof, based on information (e.g., visual information) shared therebetween. Control signals may be communicated between the control center 170 and other wellsite equipment via electric conductors (not shown). Control signals may also be communicated between the control center 170 and the communication devices associated with the field personnel operating the wellsite equipment via a communication path (e.g., a wireless communication path) including one or more of the aerial mobile communication vehicles 180. Currently known and future-developed types of signal communication are within the scope of the present disclosure.

The control center 170 may be disposed on a corresponding truck, trailer, cabin, and/or other mobile carrier 172, such as may permit its transportation to the wellsite surface 102. However, the control center 170 may be skidded or otherwise stationary, and/or may be temporarily or permanently installed at the wellsite surface 102.

FIG. 1 depicts the additive system 100 as being operable to transfer additives and produce mixtures that may be pressurized and injected into the wellbore 104 during hydraulic fracturing or cementing operations. However, it is to be understood that the additive system 100 may be operable to transfer other additives and produce other mixtures that may be pressurized and injected into the wellbore 104 during other oilfield operations, such as drilling, acidizing, chemical injecting, and/or water jet cutting operations, among other examples. While the communication system as described herein will be described in the environment of an additive system 100, it is to be understood that the communication system for providing communication between the control center 170 and communication devices associated with the field personnel may be implemented during other oilfield operations, such as drilling, cementing, acidizing, chemical injecting, and/or water jet cutting operations, among other examples, and other job site operations.

The communication system employs communication devices such as smart glasses, tablets, or other portable or wearable equipment to allow a wellsite supervisor at a control center furnished with a central repository of information on a human-machine interface (HMI) to push information about a job via communication paths including aerial mobile communication vehicles to display on the communication devices accessible by field workers. The displayed information can be selected by the wellsite supervisor and formatted to better fit the size of the display of the communication devices. Further, the displayed information can change in real time in accordance with the originating human-machine interface and facilitate performing certain tasks by the field workers. At the remote communication device, with processing power enabled right in front of a worker's line of sight, the field workers (such as equipment operators) can serve as mobile sensors to detect issues, provide context-aware equipment health, and deliver real-time information about operating parameters of the field equipment to the control center.

Additional enhancements include enabling a connection to offsite personnel that can assess an operation of a wellsite via visual content and provide real-time recommendations to the control center and communication devices at the wellsite. The wellsite supervisor and field personnel can, therefore, utilize a form of augmented reality with visual information to provide recommendations to increase efficiency and visibility with which equipment is operated. A communication system (e.g., an ad hoc communication system) as described herein includes aerial mobile communication vehicles such as drones equipped with sensors and wireless transceivers to facilitate communication at a job site.

Figure 2:
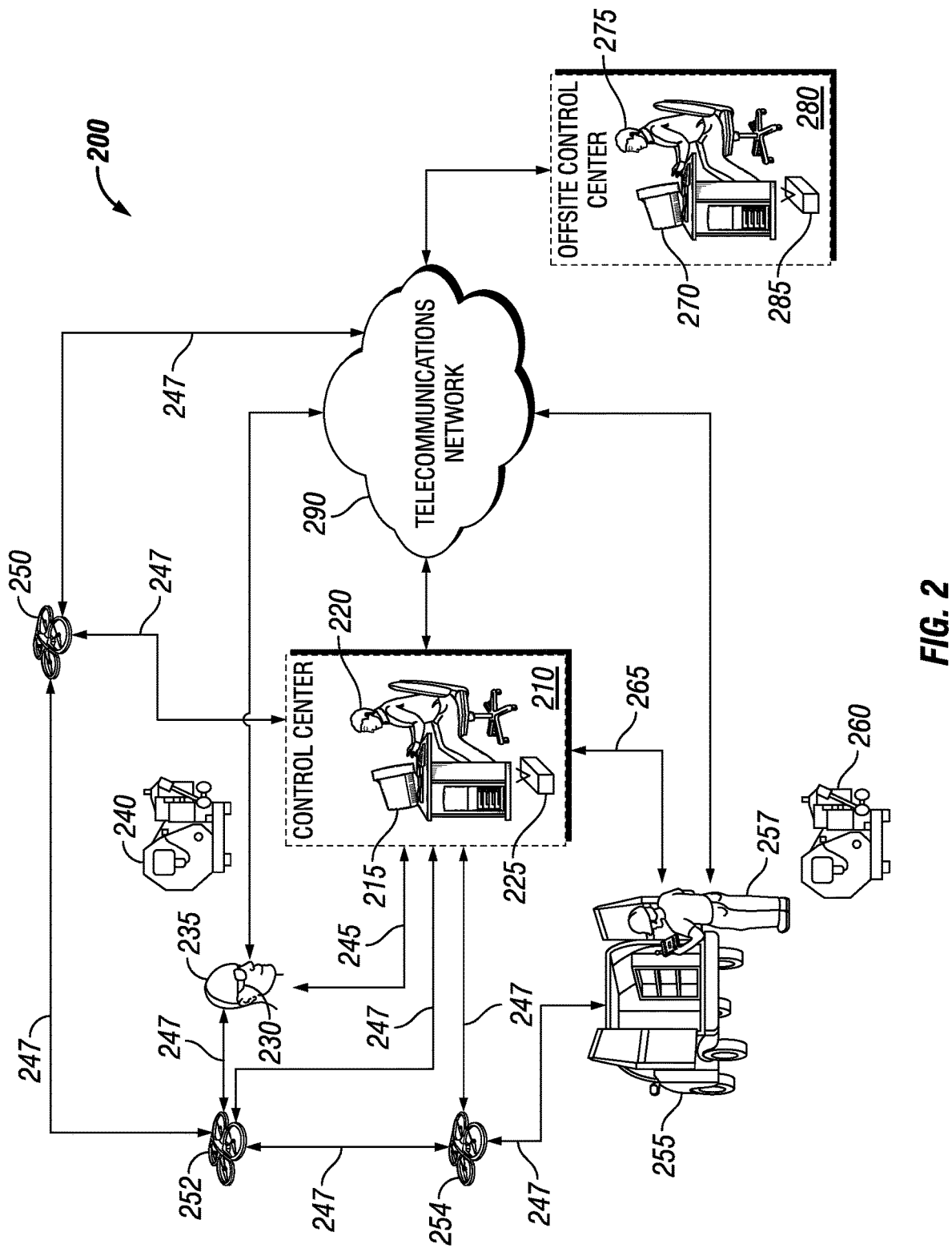
FIG. 2 is a system level view of at least a portion of an example implementation of a communication system according to one or more aspects of the present disclosure.

FIG. 2 is a system level view of at least a portion of an example implementation of a communication system 200 according to one or more aspects of the present disclosure. The communication system 200 includes a control center 210 including a computer 215 operated by a supervisor 220 at an oilfield wellsite. The computer 215 can send information to and receive information from a remote location via a communications router 225 (e.g., a wireless communications router) of the control center 210. The communications router 225 can serve as an access point for communication device(s) and/or aerial mobile communication vehicle(s) at the oilfield wellsite, as well as a gateway to allow the control center 210 to communicate with remote communication device(s) and/or offsite control center(s).

The control center 210 can communicate with a first communication device 230 (e.g., smart glasses) associated with a first field worker 235 operating a first wellsite equipment 240 over a first communication path 245 (e.g., a wireless communication path). The control center 210 can also communicate with the first communication device 230 associated with the first field worker 235 operating the first wellsite equipment 240 over aerial communication paths (generally designated 247). For example, the control center 210 can communicate with a first aerial mobile communication vehicle 250 (over a first sector of the wellsite), which can communicate with a second aerial mobile communication vehicle 252 (over a second sector of the wellsite), which can communicate with the first communication device 230, and where each such communication may be over the aerial communication paths 247. Additionally, the control center 210 can communicate with the first or second aerial mobile communication vehicles 250, 252, which can communicate with the first communication device 230, and where each such communication may be over the aerial communication paths 247. The management of the communication with the first and second aerial mobile communication vehicles 250, 252 may be under the control of the control center 210 and/or the first and/or second aerial mobile communication vehicles 250, 252, wherein one of the first and second aerial mobile communication vehicles 250, 252 may serve as a master.

The control center 210 can communicate with a second communication device 255 (e.g., tablet) associated with a second field worker 257 operating a second wellsite equipment 260 over a second communication path 265 (e.g., a wireless communication path). The control center 210 can also communicate with the second communication device 255 associated with the second field worker 257 operating the second wellsite equipment 260 over the aerial communication paths 247. For example, the control center 210 can communicate with the first aerial mobile communication vehicle 250, which can communicate with a third aerial mobile communication vehicle 254 (over a third sector of the wellsite), which can communicate with the second communication device 255, where each such communication may be over the aerial communication paths 247. Additionally, the control center 210 can communicate with the first, second, and/or third aerial mobile communication vehicles 250, 252, 254, which can communicate with the second communication device 255, where each such communication may be over the aerial communication paths 247. The management of the communication with the first, second, and third aerial mobile communication vehicles 250, 254 may be under the control of the control center 210 and/or the first, second, and/or third aerial mobile communication vehicles 250, 252, 254, wherein one of the first, second, and third aerial mobile communication vehicles 250, 252, 254 may serve as a master.

The first wellsite equipment 240 and/or the second wellsite equipment 260 may form a portion of one of the pump assemblies 150 introduced above with respect to FIG. 1. The control center 210 can communicate with an offsite computer 270 operated by an offsite supervisor 275 at an offsite control center 280 via a communications router 285 coupled to a telecommunications network 290. The control center 210 can also communicate with the offsite computer 270 operated by the offsite supervisor 275 at the offsite control center 280 over the aerial communication paths 247 via an aerial mobile communication vehicle, such as the first aerial mobile communication vehicle 250. The offsite control center 280 may be associated with another wellsite. The first and second communication devices 230, 255 can communicate with the offsite control center 280 either indirectly via the control center 210 or more directly via connection to the telecommunications network 290 through, for example, an aerial mobile communication vehicle. While the first aerial mobile communication vehicle 250 illustrates an aerial communication path 247 to the telecommunications network 290, it should also be understood that the second and third aerial mobile communication vehicles 252, 254 may also communicate with the telecommunications network 290 via an aerial communication path 247.

Thus, real-time information is communicated to the first and second field workers 235, 257 via the first and second communication devices 230, 255 to perform tasks on the first and second wellsite equipment 240, 260, respectively. The real-time information may traverse the first and second wireless communication paths 245, 265, which may be embodied in a wireless fidelity (Wi-Fi) communications path, and/or the aerial communication paths 247. The information shared between the supervisor 220 and the first and second field workers 235, 257 is presented on displays of the respective computer 215 and the first and second communication devices 230, 255. Thus, the supervisor 220 shares real-time visual information for the operation of the first and second wellsite equipment 240, 260 for execution by the first and second field workers 235, 257, respectively.

In addition, the first and second communication devices 230, 255 can provide real-time visual information about operational parameters pertaining to the first and second wellsite equipment 240, 260, respectively, to the computer 215 at the control center 210, such as to permit the supervisor 220 to assign remedial tasks and/or make recommendations to operate the same. The visual information may be in the form of an image or video of the first and second wellsite equipment 240, 260 taken by the first and second communication devices 230, 255, respectively. The supervisor 220 can also provide the visual information about the first and second wellsite equipment 240, 260 from the computer 215 to the offsite computer 270, such as to also permit the offsite supervisor 275 at the offsite control center 280 to make recommendations. Additionally, the first and second communication devices 230, 255 can provide the visual information about the first and second wellsite equipment 240, 260 to the offsite supervisor 275 at the offsite control center 280, such as to also permit the offsite supervisor 275 to also make recommendations.

In making the recommendations to, for example, the first field worker 235, the supervisor 220 can assign a task and share part of the display of the computer 215 with the display of the first communication device 230. The first field worker 235 can thereby see images visible or otherwise accessible to the supervisor 220 on the display of the first communication device 230, which may facilitate an efficient completion of the assigned task. Thus, the first field worker 235 can perform the task with a higher level of independence with remote assistance by the supervisor 220.

The first field worker 235 can also send visual content of operating parameters of the first wellsite equipment 240 via the first communication device 230 to the computer 215 of the supervisor 220 in real-time so that, for example, the supervisor 220 may have more comprehensive, relevant, and/or up-to-date information about the conditions of the first wellsite equipment 240. Based thereon, the supervisor 220 can collaborate with the first field worker 235 to ascertain a viable solution (e.g., an updated task) to operate the first wellsite equipment 240.

Instead, or in addition, by providing access to the repository of information available at the computer 215 of the control center 210, the first field worker 235 can access the information via the first communication device 230 and, with a higher level of reliability, independently set a course of action to operate the first wellsite equipment 240. The control center 210 may thus become an information conduit, and the first field worker 235 may not need continuous, direct personal input from the supervisor 220. Thus, the supervisor 220 may share the computer 215 with the first communication device 230 and may thereby alleviate the onus of giving continuous instructions to the first field worker 235. Additionally, the first field worker 235 can obtain access to the offsite computer 270 to permit the offsite supervisor 275 to provide recommendations in addition to or in lieu of the supervisor 220. If the offsite control center 280 is associated with another wellsite, the first field worker 235 can obtain access to the offsite supervisor 275 via a mesh communication system including the computer 215 at the control center 210, serving the supervisor 220, and the offsite computer 270 at the offsite control center 280, serving the offsite supervisor 275. While the aforementioned aspects have been described with respect to the first wellsite equipment 240, the principles are also applicable to other wellsite equipment, such as the second wellsite equipment 260.

In general, an onsite supervisor performs the control of a wellsite. With a communication system according to one or more aspects introduced herein, information such as visual images and other wellsite data (such as pressures, material remaining in a container, and the existence of particular equipment at the wellsite) can be communicated from the field workers at the wellsite to an offsite control center at another wellsite. This may permit equipment at a particular wellsite to be operated based on what is happening at or recommendations from different, remote wellsites. A field worker at the wellsite can review visual information from another field worker at another wellsite, which may permit a higher level of coordination therebetween. A communication path to an offsite supervisor via the control center at the wellsite (or otherwise) may permit the offsite supervisor to provide coordinating information back to the local supervisor.

Equipment at a wellsite may include a human-machine interface (HMI) and is controlled by the communication system at the control center. Operational data from various pieces of equipment are transmitted to the control center. At a conventional wellsite facility, field workers generally don't have access to data that is visible or otherwise available to a supervisor at the control center. When a field worker needs to increase, decrease, or at least be aware of a pressure in a pipe, for example, that information can be provided over a bidirectional communication path from the control center to the field worker via an HMI, such as may be available with smart glasses. Thus, a field worker can complete a task with a greater level of independence and efficiency.

The process is scalable as the number of supervisors and field workers increases at a wellsite. This permits one field worker continually to see what another field worker sees, as well as what is on a display or screen of a computer of the supervisor. The information that a field worker can see can be restricted to be pertinent to a particular job. Collaboration among a plurality of field workers can also be established. A wireless communication path from one supervisor to another supervisor can be provided, whether at the same or different wellsites. The communication system as provided herein enhances communication at a job site to augment an operation thereof including assigning tasks to field personnel at the job site. See, for example, U.S. patent application Ser. No. 14/882,660, entitled "Assignment and Management of Tasks to Perform Wellsite Operations," which is incorporated herein by reference in its entirety, for a management architecture at a job site that may employ a communication system as set forth herein.

The present disclosure introduces utilization of mobile communication devices formed with aerial mobile communication vehicles (such as drones) equipped with transceivers, processors, and sensors, and employed to form a smart ad hoc/mesh backbone network of smart communication vehicles. The aerial mobile communication vehicles are employed for wireless communication, for reporting, and for visual monitoring at a remote oilfield wellsite and/or other operational facility, including those located at a substantial distance (e.g., over 100 kilometers) offshore. The aerial mobile communication vehicles can provide automatic processing of sensor and other data in the environment of the remote operational facility. The aerial mobile communication vehicles can be aerially positioned between a control center and a communication device associated with a field worker to provide enhanced communication capabilities in a relatively uncontrolled environment, such as that of an oilfield wellsite. The aerial mobile communication vehicles positioned at a wellsite or other facility can communicate with each other and with an access point including a communications router, and thus may not rely on an a priori wireless communication infrastructure.

As the term indicates, an ad hoc network generally refers to an unplanned or variable network structure. A mesh network generally refers to a network structure formed with a plurality of communication devices employing a topology such as a ring topology, a star topology, etc. An ad hoc/mesh network according to one or more aspects of the present disclosure can be formed with aerial mobile communication vehicles each equipped with a self-contained processor, which can automatically extend network connectivity and respond to changes in the underlying operational facility without impacting network connectivity, particularly if there is an equipment change on the ground. Thus, a smart network formed with the aerial mobile communication vehicles within the scope of the present disclosure can respond to operational changes and can seamlessly maintain connectivity among field personnel, wellsite sensors, and a control center that can provide control capabilities as well as access to a wide area network, such as the Internet.

The ad hoc/mesh network can establish a plurality of communication paths or routes from a first point to a second point at the wellsite. If one communication route is blocked, the network can automatically engage an alternative communication route employing different aerial mobile communication vehicles until the first route is repaired.

The smart features of the aerial mobile communication vehicles can be within the aerial mobile communication vehicle itself by means of an embedded processor or a field programmable gate array (FPGA), or from a central control point (e.g., a control center). The intelligence of a management structure to alter and modify the network can thus be distributed among the aerial mobile communication vehicles and/or can be provided by the central control point. The intelligence of the management structure can react to a network or vehicle failure to maintain an operational state of the ad hoc network. Each aerial mobile communication vehicle can use information acquired by an internal monitoring function to position or reposition itself within a known local region (or sector) in which a wellsite is disposed, take a further action, or send an alert to a central monitoring point, such as a wellsite control center.

From another perspective, there are generally many sensors at a wellsite for monitoring wellsite operations, such as pressure and temperature gauges and chemical sensors, and that are widely distributed across the wellsite and among diverse pieces of the wellsite equipment. Many present communication devices (such as Bluetooth devices) use low transmitter power and are restricted to short communication ranges, such that substantial human effort is still utilized to collect data and maintain an operating condition of a local wireless network. The aerial mobile communication vehicles of the present disclosure, however, can be repositioned, either automatically or by a control message from the control center, to accommodate network functionality to monitor such sensors at the wellsite. The aerial mobile communication vehicles can be equipped with transceivers operational with a Wi-Fi, WiMAX, and/or other communication protocol that is appropriate for an intended range and bandwidth of communication.

The location of each aerial mobile communication vehicle can be programmed to one or more intermediate or end waypoints employing global positioning system (GPS) sensors or receivers to self-identify the vehicle's position. The aerial mobile communication vehicles can be sent to locations identified with coordinates acquired with the GPS receivers. The locations to which the aerial mobile communication vehicles are assigned can be changed in real-time to, for example, maintain a level of connectivity with the field equipment, personnel, and/or sensors. The aerial mobile communication vehicles can be configured to calculate a path from an initial launching point to an assigned location of an end target.

From a monitoring perspective, an aerial mobile communication vehicle can capture images of general wellsite equipment such as gauges and other on-site monitoring elements. A camera of the vehicle, such as may be formed with a digital visual sensor, can be employed for the monitoring function. The aerial mobile communication vehicle can also be formed with a temperature, pressure, chemical, and/or other sensor for monitoring a corresponding condition at the wellsite. The position and functionality of each vehicle can be controlled locally, e.g., by the vehicle itself, or remotely.

An aerial mobile communication vehicle can provide an access point that can function as a gateway for local communication access to the Internet or other communication backbone. The ad hoc network can be configured to communicate with a local access point, such as in a local wellsite control center, to provide wireless communication with a wide area network, the Internet, a public switch telephone network, and/or other networks.

Figure 3:
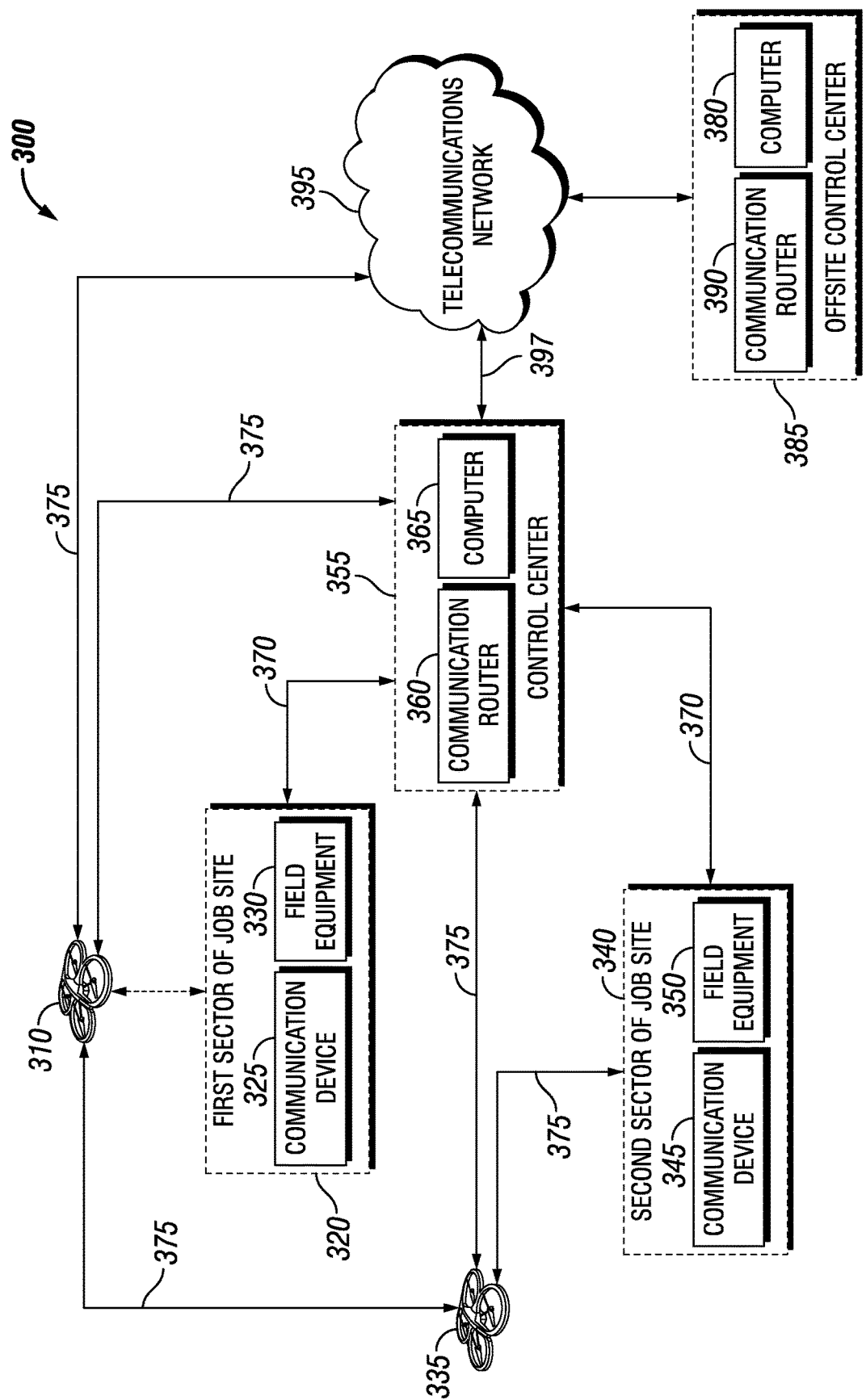
FIG. 3 is a system level view of at least a portion of an example implementation of a communication system according to one or more aspects of the present disclosure.

FIG. 3 is a system level view of at least a portion of an example implementation of a communication system 300 according to one or more aspects of the present disclosure. The communication system 300 is operable at a job site having a plurality of sectors and a control center. The communication system 300 includes a first aerial mobile communication vehicle 310 positioned over a first sector 320 of the job site. The first aerial mobile communication vehicle 310 is able to communicate with a first communication device 325 proximate first field equipment 330 located in the first sector 320. The communication system 300 also includes a second aerial mobile communication vehicle 335 positioned over a second sector 340 of the job site, and able to communicate with a second communication device 345 proximate second field equipment 350 located in the second sector 340. The first and second aerial mobile communication vehicles 310, 335 may be instances of the aerial mobile communication vehicles 180, 250, 252, 254 described above. The communication system 300 also includes a control center 355 including a communication router 360 and a computer 365. The first and second communication devices 325, 345 may each be or include smart glasses, a smartphone, and/or a tablet, for example.

The first and second communication devices 325, 345 can communicate with the computer 365 of the control center 355 (via the communication router 360) over communication paths (generally designated 370) and/or over aerial communication paths (generally designated 375). Thus, data can be communicated between the control center 355 and the first communication device 325 via the first aerial mobile communication vehicle 310, and data can be communicated between the control center 355 and the second communication device 345 via the second aerial mobile communication vehicle 335. It is possible that the first and second sectors 320, 340 may at least partially overlap.

The management of the communication with, and overall control of, the first and second aerial mobile communication vehicles 310, 335 may be under the control of the control center 355 and/or the first and/or second aerial mobile communication vehicles 310, 335, wherein one of the first and second aerial mobile communication vehicles 310, 335 may serve as a master. For example, the control center 355 may control a location of the first and second aerial mobile communication vehicles 310, 335 over the first and second sectors 320, 340, respectively. The location of the first and second aerial mobile communication vehicles 310, 335 over the first and second sectors 320, 340, respectively, may be controlled in accordance with a GPS receiver associated with each of the first and second aerial mobile communication vehicles 310, 335. The first and second aerial mobile communication vehicles 310, 335 may serve to establish and share a management function of an ad hoc communication system.

The control center 355 can communicate with an offsite computer 380 operated at an offsite control center 385 (remote from the job site) via a communications router 390 coupled to a telecommunications network 395. The control center 355 can communicate with the offsite computer 380 at the offsite control center 385 via a communication path 397 from the control center 355 to the telecommunications network 395. The control center 355 can also communicate with the offsite computer 380 at the offsite control center 385 over the aerial communication paths 375 via an aerial mobile communication vehicle, such as the first aerial mobile communication vehicle 310. Thus, the first communication device 325 can communicate with the offsite computer 380 of the offsite control center 385 over the communication path 397 from the control center 355 to the telecommunications network 395 and/or over the aerial communication paths 375 to the telecommunications network 395. The first communication device 325, therefore, can communicate data with the offsite computer 380 of the offsite control center 385 via the aerial mobile communication vehicles, such as the first aerial mobile communication vehicle 310.

The first and second aerial mobile communication vehicles 310, 335 can sense and/or monitor operating parameters in the first and second sectors 320, 340, respectively, and provide the operating parameters to the control center 355 and/or the offsite control center 385. The first and second aerial mobile communication vehicles 310, 335 may cooperate with the first and second communication devices 325, 345 to sense and/or monitor operating parameters associated with, for example, the first and second field equipment 330, 350, respectively. The operating parameters may include chemical composition, pressure, temperature, etc. associated with the first and second sectors 320, 340. The first and second aerial mobile communication vehicles 310, 335 may create an image and/or a video of the operating parameters. The first and second aerial mobile communication vehicles 310, 335 may assign tasks to field workers to operate the first and second field equipment 330, 350 via the first and second communication devices 325, 345, respectively.

Figure 4:
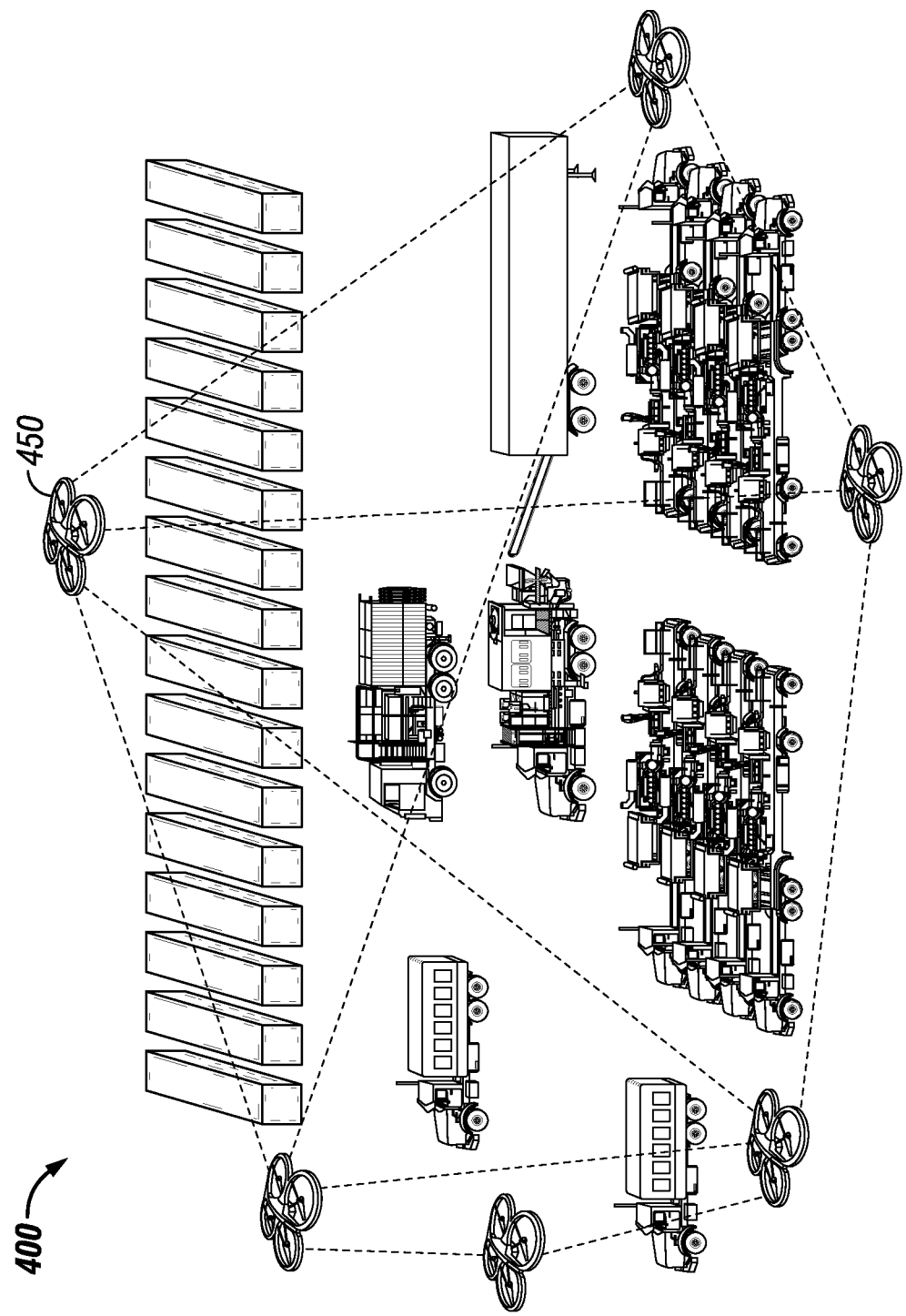
FIG. 4 is a system level view of at least a portion of an example implementation of a communication system according to one or more aspects of the present disclosure.

FIG. 4 is a system level view of at least a portion of an example implementation of a communication system according to one or more aspects of the present disclosure. The communication system 400 forms an ad hoc communication mesh network at an oilfield wellsite or other job site with aerial mobile communication vehicles, one of which is designated 450. The aerial mobile communication vehicles 450 may be instances of the aerial mobile communication vehicles 180, 250, 252, 254, 310, 335 described above. For example, the aerial mobile communication vehicles 450 may be equipped with wireless transceivers for communication therebetween and with, for example, temperature, pressure, and/or chemical sensors for acquiring operational data at the job site. The aerial mobile communication vehicles 450 can also communicate wirelessly with a control center, such as the control center 355 illustrated and described hereinabove with reference to FIG. 3. The aerial mobile communication vehicles 450 can communicate alerts, live-video feeds, real-time sensor data, field personnel positions, routing data, field equipment health reports, and other data among the aerial mobile communication vehicles 450 and to the control center and/or another control center. Communication of such data to the control center and/or another control center can be via cellular, satellite, and/or other wireless communication technology. Control of the aerial mobile communication vehicles 450 can be performed by the collective intelligence of the aerial mobile communication vehicles 450, or by a control location such as by a control center.

Figure 5:
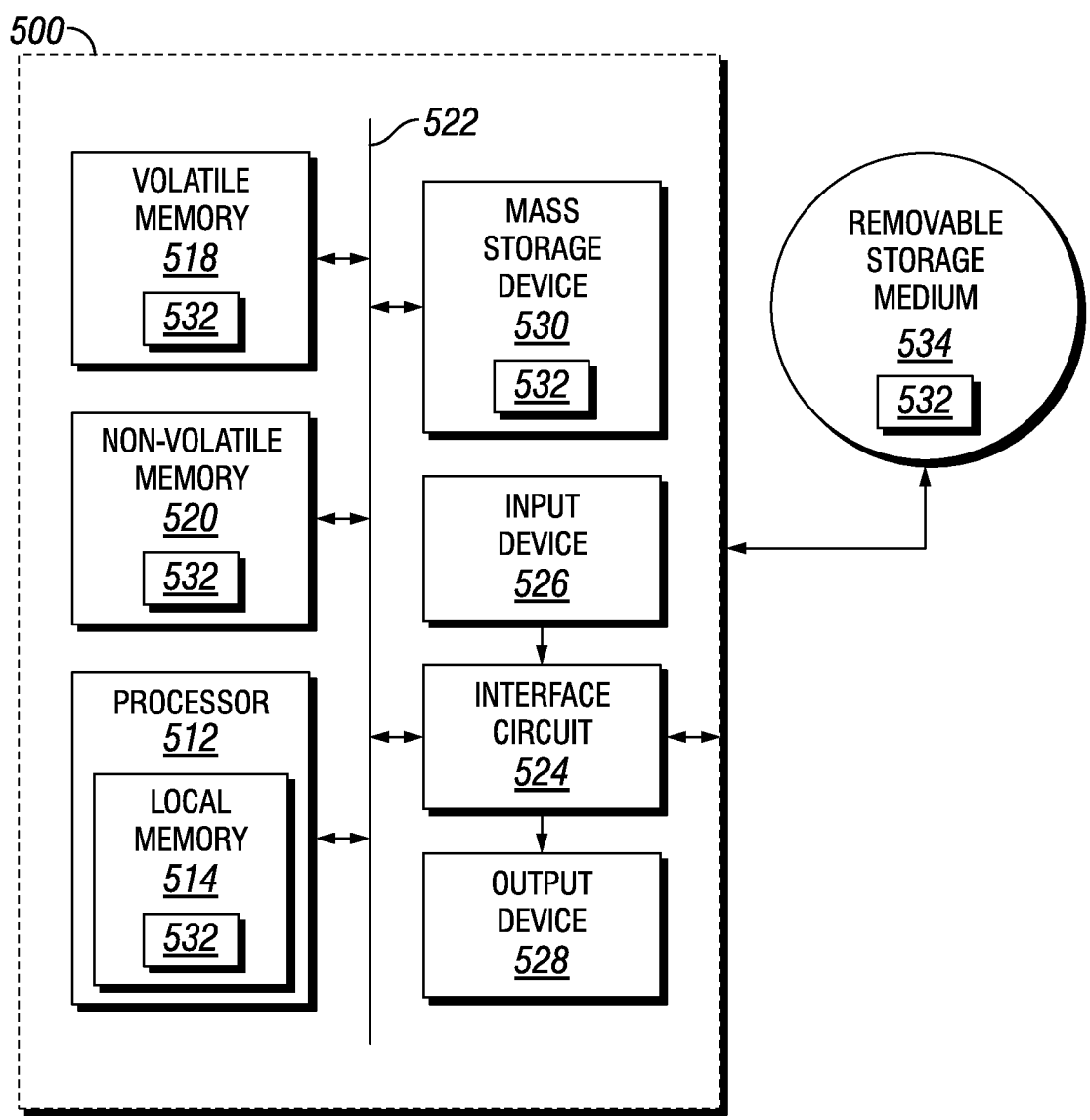
FIG. 5 is a schematic view of at least a portion of an example implementation of an apparatus of a communication system according to one or more aspects of the present disclosure.

FIG. 5 is a schematic view of at least a portion of an apparatus of a communication system according to one or more aspects of the present disclosure. The apparatus may form a communication device, computer, and/or aerial mobile communication vehicle, among other things, of the communication system. The apparatus is or comprises a processing system 500 that may execute example machine-readable instructions to implement at least a portion of one or more of the methods and/or processes described herein, and/or to implement an assignment and management of tasks to perform operations at a job site and facilitate communications at a job site. The processing system 500 may be or comprise, for example, one or more processors, controllers, special-purpose computing devices, servers, personal computers, personal digital assistant (PDA) devices, smartphones, smart glasses, tablets, internet appliances, and/or other types of computing devices. Moreover, while it is possible that the entirety of the processing system 500 shown in FIG. 5 is implemented within the apparatus, it is also contemplated that one or more components or functions of the processing system 500 may be external to the processing system 500.

The processing system 500 may comprise a processor 512 such as, for example, a general-purpose programmable processor. The processor 512 may comprise a local memory 514, and may execute coded instructions 532 present in the local memory 514 and/or another memory device. The processor 512 may execute, among other things, machine-readable instructions or programs to implement the methods and/or processes described herein. The programs stored in the local memory 514 may include program instructions or computer program code that, when executed by an associated processor, enable surface equipment at a wellsite or offsite to perform tasks as described herein. The processor 512 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 512 may be in communication with a main memory, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 520 may be, comprise, or be implemented by read-only memory, flash memory and/or other types of memory devices. One or more memory controllers (not shown) may control access to the volatile memory 518 and/or the non-volatile memory 520.

The processing system 500 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, a satellite interface, a global positioning system (GPS) and/or a cellular interface or receiver, among others. The interface circuit 524 may also comprise a graphics driver card. The interface circuit 524 may also comprise a device such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 526 may be connected to the interface circuit 524. The input device(s) 526 may permit a user to enter data and commands into the processor 512. The input device(s) 526 may be, comprise, or be implemented by, for example, a keyboard, a mouse, a touchscreen, a track-pad, a trackball, an isopoint, and/or a voice recognition system, among others. The input device(s) 526 may comprise an image-capturing device configured to capture an image or video and provide visual content of field equipment at a job site and/or a sensor configured to capture operating parameters at the job site.

One or more output devices 528 may also be connected to the interface circuit 524. The output devices 528 may be, comprise, or be implemented by, for example, display devices (e.g., a light-emitting diode (LED) display, a liquid crystal display (LCD, or a cathode ray tube (CRT) display, among others), printers, and/or speakers, among others.

The processing system 500 may also comprise one or more mass storage devices 530 for storing machine-readable instructions and data. Examples of such mass storage devices 530 include floppy disk drives, hard drive disks, compact disk (CD) drives, and digital versatile disk (DVD)

drives, among others. The coded instructions 532 may be stored in the mass storage device 530, the volatile memory 518, the non-volatile memory 520, the local memory 514, and/or on a removable storage medium 534, such as a CD or DVD. Thus, the modules and/or other components of the processing system 500 may be implemented in accordance with hardware (embodied in one or more chips including an integrated circuit such as an ASIC), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

The present disclosure introduces an aerial mobile communication vehicle at a job site having a plurality of sectors and a control center. Examples of the aerial mobile communication vehicle include the vehicles 180, 250, 252, 254, 310, 335, 450 described above. The aerial mobile communication vehicle includes a processor 512 and memory (e.g., the memory 514) including computer program code (e.g., coded instructions 532) that cause the aerial mobile communication vehicle to receive instructions for positioning the aerial mobile communication vehicle over a sector of the job site and communicating data between the control center and a communication device (e.g., smart glasses, smartphone or tablet) within the sector of the job site. The control center may be remote from the job site. A GPS receiver (such as may be part of the interface circuit 524) of the aerial mobile communication vehicle is operable to assist the positioning of the aerial mobile communication vehicle over the sector of the job site.

The aerial mobile communication vehicle may also communicate data with another aerial mobile communication vehicle at the job site. The aerial mobile communication vehicle may provide control information to or receive control information from the other aerial mobile communication vehicle at the job site. The aerial mobile communication vehicle may serve as a master aerial mobile communication vehicle. The aerial mobile communication vehicle and the other aerial mobile communication vehicle may serve to establish an ad hoc communication system. The aerial mobile communication vehicle and the other aerial mobile communication vehicle may share a management function of the ad hoc communication system.

The processor 512 and memory 514 including computer program code 532 may also cause the aerial mobile communication vehicle to receive control information from the control center. The processor 512 and memory 514 including computer program code 532 may cause the aerial mobile communication vehicle to sense and/or monitor operating parameters in the sector, and provide the operating parameters to the control center. The aerial mobile communication vehicle may sense the operating parameters in the sector in cooperation with the communication device. The aerial mobile communication vehicle may sense the operating parameters by creating an image and/or a video of the operating parameters.

The communication device may be associated with certain field equipment in the sector, and the processor 512 and memory 514 including computer program code 532 may cause the aerial mobile communication vehicle to receive a task for operating the field equipment from the control center, provide the task to the communication device, receive content of operating parameters of the field equipment in response to the task, provide the content to the control center, receive an updated task for operating the field equipment in response to the content from the control center, and provide the updated task to the communication device. The job site may be an oilfield wellsite, in which case the field equipment may be wellsite equipment and the task and updated task may represent oilfield tasks for operating the wellsite equipment.

The present disclosure also introduces an apparatus (e.g., a personal computer) in communication with first and/or second aerial mobile communication vehicles at a job site. The apparatus includes a processor 512 and memory (e.g., the memory 514) including computer program code (e.g., coded instructions 532) that cause the apparatus to provide instructions for positioning the first and/or second aerial mobile communication vehicles over first and second sectors, respectively, of the job site, and provide control information to direct the first and/or second aerial mobile communication vehicles to communicate data between a control center and first and second communication devices (e.g., smart glasses, smartphone or tablet) within the first and second sectors, respectively, of the job site. The first and second sectors may at least partially overlap. The apparatus may be located at the control center or within another aerial mobile communication vehicle, which may be remote from the job site.

The processor 512 and memory 514 including computer program code 532 may also cause the apparatus to provide control information to direct the first aerial mobile communication vehicle to sense and/or monitor operating parameters (e.g., by creating an image and/or a video of the operating parameters) in the first sector. The processor 512 and memory 514 including computer program code 532 may cause the apparatus to receive the operating parameters from the first aerial mobile communication vehicle.

The first communication device may be associated with a first field equipment in the first sector, in which case the processor 512 and memory 514 including computer program code 532 may cause the apparatus to assign a task for operating the first field equipment, provide the task to the first aerial mobile communication vehicle, receive content of operating parameters of the first field equipment in response to the task via the first aerial mobile communication vehicle, assign an updated task for operating the first field equipment in response to the content, and provide the updated task to the first aerial mobile communication vehicle. The job site may be an oilfield wellsite, in which case the first field equipment may be wellsite equipment, and the task and updated task may represent oilfield tasks for operating the wellsite equipment.

Figure 6:
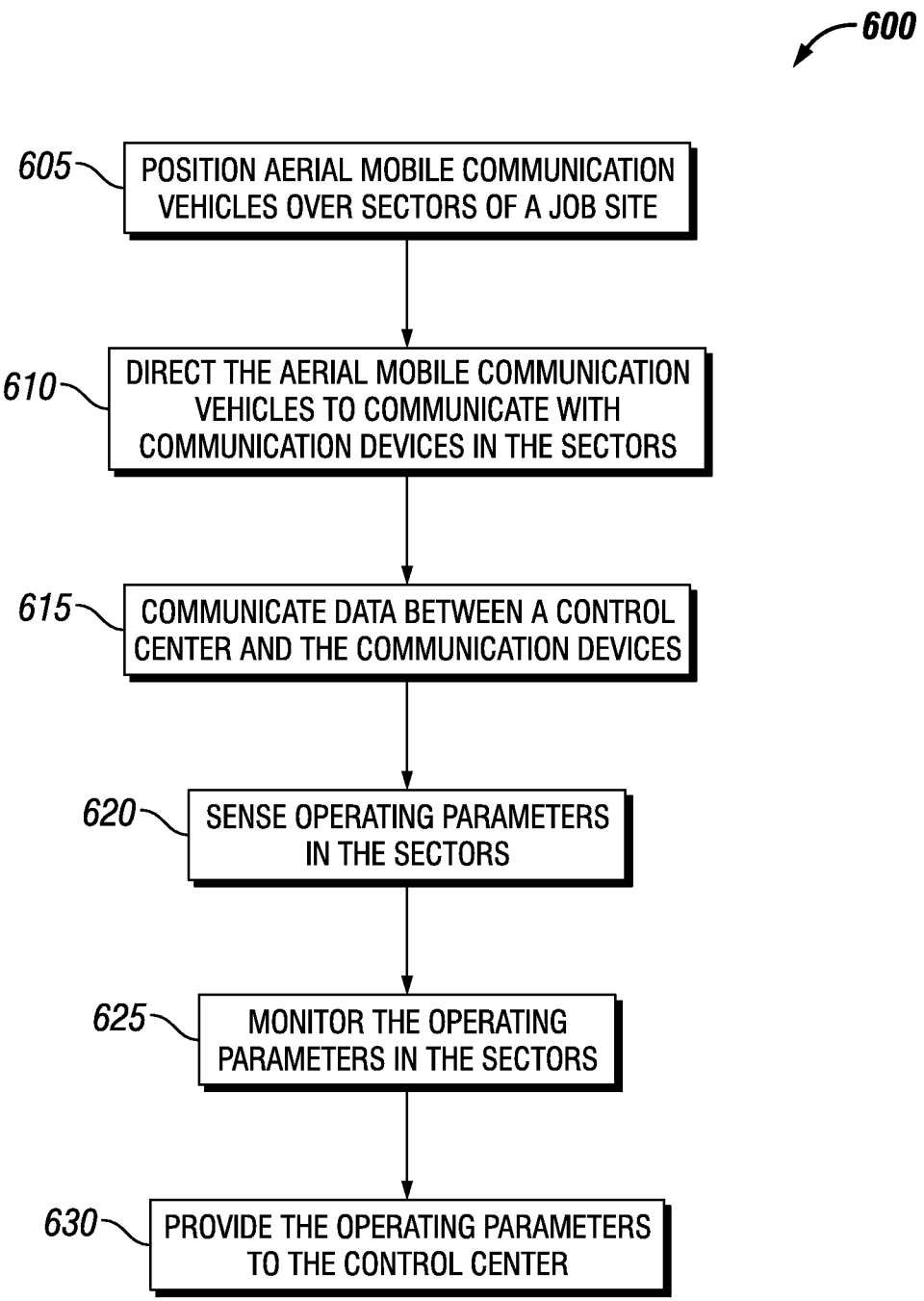
FIG. 6 is a flow-chart diagram of at least a portion of an example implementation of a method according to one or more aspects of the present disclosure.

FIG. 6 is a flow-chart diagram of at least a portion of an example implementation of a method (600) according to one or more aspects of the present disclosure. The method (600) may be performed utilizing at least a portion of one or more implementations of the apparatus shown in FIG. 5 and/or otherwise within the scope of the present disclosure, including a communication system as shown in one or more of FIGS. 1-4 and/or otherwise within the scope of the present disclosure. While the method (600) is described below with respect to a communication system including a plurality of aerial mobile communication vehicles, the method (600) is equally applicable to a communication system including a single aerial mobile communication vehicle.

The method (600) includes operating a communication system at a job site having a plurality of sectors and a control center. The control center may be located at the job site or be an offsite control center located remote from the job site, such as another job site, and ones of the plurality of sectors may overlap at the job site. The method (600) includes positioning (605) first and second aerial mobile communication vehicles over first and second sectors, respectively, of the job site, and directing (610) the first and second aerial mobile communication vehicles to communicate with first and second communication devices in the first and second sectors, respectively. The method (600) continues by communicating (615) data between the control center and the first and second communication devices via the first and second aerial mobile communication vehicles, respectively. The first and second communication devices may include, without limitation, smart glasses, a smartphone, and a tablet.

The management of the communication with, and overall control of, the first and second aerial mobile communication vehicles may be under the control of the control center and/or the first and/or second aerial mobile communication vehicles, including in implementations in which one of the first and second aerial mobile communication vehicles may serve as a master. For example, the control center may control a location of the first and second aerial mobile communication vehicles over the first and second sectors of the job site. The location of the first and second aerial mobile communication vehicles over the first and second sectors, respectively, may be controlled in accordance with GPS receivers each associated with a corresponding one of the first and second aerial mobile communication vehicles. The first and second aerial mobile communication vehicles may serve to establish and share a management function of an ad hoc communication system.

The method (600) also includes sensing (620) operating parameters in the first and second sectors of the job site and monitoring (625) the operating parameters in the first and second sectors. The sensing (620) may be performed in the first sector by the first aerial mobile communication vehicle, and may be performed in the second sector with the second communication device and the second aerial mobile communication vehicle. The sensing (620) may also include creating an image and/or a video of the operating parameters. The method (600) continues by providing (630) the operating parameters to the control center via, for example, the first and/or second aerial mobile communication vehicles.

Figure 7:
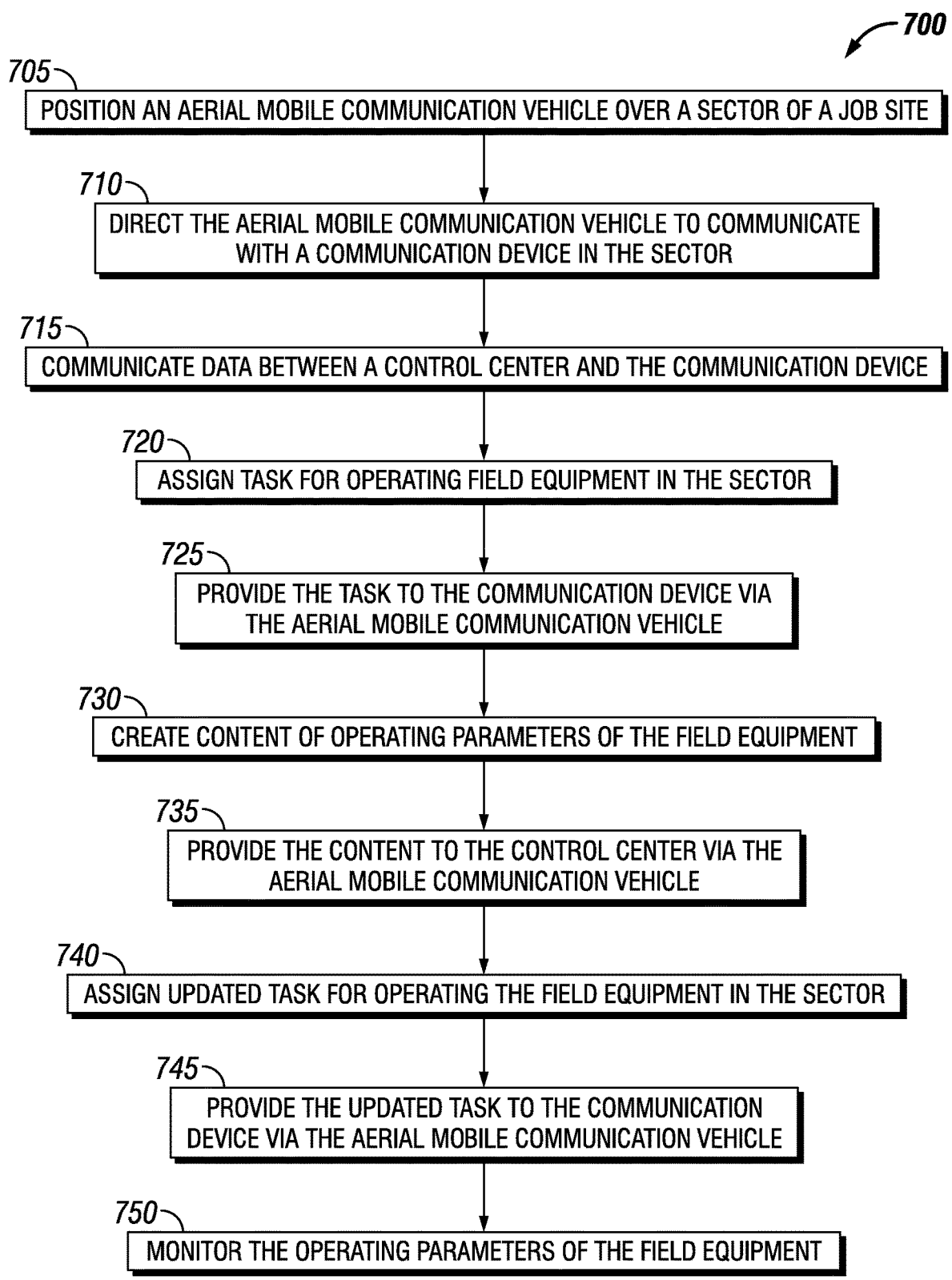
FIG. 7 is a flow-chart diagram of at least a portion of an example implementation of a method according to one or more aspects of the present disclosure.

FIG. 7 is a flow-chart diagram of at least a portion of an example implementation of a method (700) according to one or more aspects of the present disclosure. The method (700) may be performed utilizing at least a portion of one or more implementations of the apparatus shown in FIG. 5 and/or otherwise within the scope of the present disclosure, including a communication system as shown in one or more of FIGS. 1-4 and/or otherwise within the scope of the present disclosure.

The method (700) relates to or includes operating a communication system at a job site having a plurality of sectors and a control center. The control center may be located at the job site or be an offsite control center located remote from the job site, such as another job site. Two or more of the sectors may overlap at the job site. The method (700) includes positioning (705) an aerial mobile communication vehicle over a sector of the job site and directing (710) the aerial mobile communication vehicle to communicate with a communication device in the sector. The method (700) continues by communicating (715) data between the control center and the communication device via the aerial mobile communication vehicle. The communication device may include, without limitation, smart glasses, a smartphone, and a tablet.

The management of the communication with, and overall control of, the aerial mobile communication vehicle may be under the control of the control center and/or another aerial mobile communication vehicle of the communication system, such as where one of the aerial mobile communication vehicles may serve as a master. For example, the control center may control a location of the aerial mobile communication vehicle over the sector of the job site. The location of the positioned (705) aerial mobile communication vehicle over the sector may be controlled in accordance with a GPS receiver associated therewith. The positioned (705) aerial mobile communication vehicle, in conjunction with other aerial mobile communication vehicles of the system, may serve to establish and share a management function of an ad hoc communication system.

The communication device may be associated with field equipment in the sector of the job site. The method (700) also includes assigning (720) a task for operating the field equipment at the control center and providing (725) the task to the communication device via the aerial mobile communication vehicle. The method (700) continues by creating (730) content of operating parameters of the field equipment in response to the task, and providing (735) the content to the control center via the positioned (705) aerial mobile communication vehicle. The method (700) continues by assigning (740) an updated task for operating the field equipment in response to the content at the control center, and providing (745) the updated task to the communication device via the positioned (705) aerial mobile communication vehicle. The method (700) also includes monitoring (750) the operating parameters of field equipment with the communication device and/or the positioned (705) aerial mobile communication vehicle. The job site may be an oilfield wellsite, in which case the field equipment may be wellsite equipment, and the task and updated task may represent oilfield tasks for operating the wellsite equipment.

In view of the entirety of the present disclosure, including the figures and the claims, a person having ordinary skill in the will readily recognize that the present disclosure introduces a method comprising: positioning an aerial mobile communication vehicle over one of a plurality of sectors of a job site, wherein a control center is associated with the job site, and wherein the aerial mobile communication vehicle is able to communicate with a communication device in the one sector; and communicating data between the control center and the communication device via the aerial mobile communication vehicle.

The aerial mobile communication vehicle may be a first aerial mobile communication vehicle, the one sector may be a first sector, the communication device may be a first communication device, and the method may further comprise: positioning a second aerial mobile communication vehicle over a second sector of the plurality of sectors, wherein the second aerial mobile communication vehicle is able to communicate with a second communication device in the second sector; and communicating data between the control center and the second communication device via the first and/or second aerial mobile communication vehicles. The first and second sectors may at least partially overlap. The method may further comprise controlling the first and second aerial mobile communication vehicles with the control center. The first aerial mobile communication vehicle may serve as a master aerial mobile communication vehicle. The first and second aerial mobile communication vehicles may serve to establish an ad hoc communication system, including implementations in which the first and second aerial mobile communication vehicles may share a management function of the ad hoc communication system.

The method may further comprise controlling the aerial mobile communication vehicle with the control center.

The method may further comprise controlling a location of the aerial mobile communication vehicle over the one sector.

The method may further comprise controlling a location of the aerial mobile communication vehicle over the one sector with the control center.

The method may further comprise controlling a location of the aerial mobile communication vehicle over the one sector employing a GPS receiver.

The control center may be remote from the job site.

The communication device may be selected from the group consisting of: smart glasses; a smartphone; and a tablet computer.

The method may further comprise sensing operating parameters in the one sector. The method may further comprise monitoring the sensed operating parameters. The method may further comprise providing the sensed operating parameters to the control center via the aerial mobile communication vehicle. Sensing the operating parameters may be performed by the communication device and/or the aerial mobile communication vehicle. Sensing the operating parameters may further comprise creating an image and/or a video of the operating parameters.

The communication device may be associated with field equipment in the one sector, and the method may further comprise: assigning a task for operating the field equipment at the control center; providing the task to the communication device via the aerial mobile communication vehicle; creating content of operating parameters of the field equipment in response to the task; providing the content to the control center via the aerial mobile communication vehicle; assigning an updated task for operating the field equipment in response to the content at the control center; and providing the updated task to the communication device via the aerial mobile communication vehicle. The job site may be an oilfield wellsite, the field equipment may be wellsite equipment, and the task and updated task may represent oilfield tasks for operating the wellsite equipment.

The present disclosure also introduces an aerial mobile communication vehicle comprising: a processor; and a memory including computer program code, wherein the processor, the memory, and the computer program code are collectively operable to cause the aerial mobile communication vehicle to: receive instructions for positioning the aerial mobile communication vehicle over one of a plurality of sectors at a job site; and communicate data between a control center associated with the job site and a communication device within the one sector.

The processor, the memory, and the computer program code may further be collectively operable to cause the aerial mobile communication vehicle to communicate data with an additional aerial mobile communication vehicle positioned over an additional one of the plurality of sectors. The processor, the memory, and the computer program code may further be collectively operable to cause the aerial mobile communication vehicle to provide control information to or receive control information from the additional aerial mobile communication vehicle at the job site. The aerial mobile communication vehicle may serve as a master aerial mobile communication vehicle. The aerial mobile communication vehicle and the additional aerial mobile communication vehicle may serve to establish an ad hoc communication system, including implementations in which the aerial mobile communication vehicle and the additional aerial mobile communication vehicle may share a management function of the ad hoc communication system.

The processor, the memory, and the computer program code may further be collectively operable to cause the aerial mobile communication vehicle to receive control information from the control center.

The aerial mobile communication vehicle may further comprise a GPS receiver operable to assist positioning of the aerial mobile communication vehicle over the one sector.

The control center may be remote from the job site.

The communication device may be selected from the group consisting of: smart glasses; a smartphone; and a tablet computer.

The processor, the memory, and the computer program code may further be collectively operable to cause the aerial mobile communication vehicle to sense operating parameters in the one sector. The processor, the memory, and the computer program code may further be collectively operable to cause the aerial mobile communication vehicle to monitor the operating parameters in the one sector. The processor, the memory, and the computer program code may further be collectively operable to cause the aerial mobile communication vehicle to provide the operating parameters to the control center. The processor, the memory, and the computer program code may further be collectively operable to cause the aerial mobile communication vehicle to sense the operating parameters in the one sector in cooperation with the communication device. The processor, the memory, and the computer program code may further be collectively operable to cause the aerial mobile communication vehicle to sense the operating parameters by creating an image and/or a video of the operating parameters.

The communication device may be associated with field equipment in the one sector, and the processor, the memory, and the computer program code may further be collectively operable to cause the aerial mobile communication vehicle to: receive a task for operating the field equipment from the control center; provide the task to the communication device; receive content of operating parameters of the field equipment in response to the task; provide the content to the control center; receive an updated task for operating the field equipment in response to the content from the control center; and provide the updated task to the communication device. The job site may be an oilfield wellsite, the field equipment may be wellsite equipment, and the task and updated task may represent oilfield tasks for operating the wellsite equipment.

The present disclosure also introduces an apparatus in communication with an aerial mobile communication vehicle at a job site, comprising: a processor; and a memory including computer program code, wherein the processor, the memory, and the computer program code are collectively operable to cause the apparatus to: provide instructions for positioning the aerial mobile communication vehicle over a sector of the job site; and provide control information to direct the aerial mobile communication vehicle to communicate data between a control center and a communication device within the sector.

The aerial mobile communication vehicle may be a first aerial mobile communication vehicle, the sector may be a first sector, the communication device may be a first communication device, and the processor, the memory, and the computer program code may further be collectively operable to cause the apparatus to: provide instructions for positioning a second aerial mobile communication vehicle over a second sector of the job site; and provide control information to direct the second aerial mobile communication vehicle to communicate data between the control center and a second communication device within the second sector. The first and second sectors may at least partially overlap.

The apparatus may be located at the control center or within another aerial mobile communication vehicle.

The control center may be remote from the job site.

The communication device may be selected from the group consisting of: smart glasses; a smartphone; and a tablet computer.

The processor, the memory, and the computer program code may further be collectively operable to cause the apparatus to provide control information to direct the aerial mobile communication vehicle to sense operating parameters in the sector. The processor, the memory, and the computer program code may further be collectively operable to cause the apparatus to provide control information to direct the aerial mobile communication vehicle to monitor the operating parameters in the sector. The processor, the memory, and the computer program code may further be collectively operable to cause the apparatus to receive the operating parameters from the aerial mobile communication vehicle.

The communication device may be associated with field equipment in the sector, and the processor, the memory, and the computer program code may further be collectively operable to cause the apparatus to: assign a task for operating the field equipment; provide the task to the aerial mobile communication vehicle; receive content of operating parameters of the field equipment in response to the task via the aerial mobile communication vehicle; assign an updated task for operating the field equipment in response to the content; and provide the updated task to the aerial mobile communication vehicle. The job site may be an oilfield wellsite, the field equipment may be wellsite equipment, and the task and updated task may represent oilfield tasks for operating the wellsite equipment.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method, comprising:
    positioning an aerial mobile communication vehicle over one sector of a plurality of sectors of an oilfield wellsite;
    establishing an ad hoc/mesh network with the aerial mobile communication vehicle, wherein the aerial mobile communication vehicle is configured to directly communicate, via the ad hoc/mesh network, with a first communication device in the one sector and a control center associated with the oilfield wellsite, wherein the first communication device comprises at least a set of smart glasses, and wherein the first communication device is associated with a first user and with wellsite equipment in the one sector;
    collecting data related to the oilfield wellsite via one or more sensors of the aerial mobile communication vehicle;
    directly communicating the data to the control center and the first communication device via the aerial mobile communication vehicle and over the ad hoc/mesh network, wherein the data comprises one or more images associated with measuring equipment related to the oilfield wellsite;
    based on the data, assigning, via the control center, an oilfield task to the first user for the first user to perform by operating the wellsite equipment, wherein assigning the oilfield task for operating the wellsite equipment comprises:
        displaying visual information from the set of smart glasses to a second user via a second communication device associated with the second user; and
        receiving user input from the second communication device indicative of assignment of the oilfield task to the first user; and
    providing the oilfield task to the first communication device via the aerial mobile communication vehicle.

2. The method of claim 1 wherein the aerial mobile communication vehicle is a first aerial mobile communication vehicle, the one sector is a first sector, and the method further comprises:
    positioning a second aerial mobile communication vehicle over a second sector of the plurality of sectors, wherein the second aerial mobile communication vehicle is configured to communicate with a third communication device in the second sector; and
    communicating the data between the control center and the second communication device via the first and/or second aerial mobile communication vehicles, wherein establishing comprises establishing the ad hoc/mesh network with the first and second aerial mobile communication vehicles.

3. The method of claim 2 wherein the first aerial mobile communication vehicle serves as a master aerial mobile communication vehicle.

4. The method of claim 2 wherein the first and second aerial mobile communication vehicles share a management function of the ad hoc/mesh network.

5. The method of claim 1 further comprising controlling the aerial mobile communication vehicle with the control center, wherein controlling the aerial mobile communication vehicle comprises controlling a location of the aerial mobile communication vehicle over the one sector via the control center.

6. The method of claim 1 further comprising controlling a location of the aerial mobile communication vehicle over the one sector by employing a global positioning system (GPS) receiver.

7. The method of claim 1 further comprising:
    sensing and/or monitoring operating parameters in the one sector via the aerial mobile communication vehicle or the first communication device; and
    providing the sensed and/or monitored operating parameters to the control center via the aerial mobile communication vehicle.

8. The method of claim 1 further comprising:
    creating content of operating parameters of the wellsite equipment in response to performance of the oilfield task;

providing the content to the control center via the aerial mobile communication vehicle;
assigning an updated oilfield task for operating the wellsite equipment in response to the content via the control center; and
providing the updated oilfield task to the first communication device via the aerial mobile communication vehicle.

9. The method of claim 1 comprising modifying a topology of the ad hoc/mesh network comprising the aerial mobile communication vehicle based on detected movement of ground equipment of the oilfield wellsite.

10. The method of claim 9 wherein the ground equipment comprises a pump assembly of the oilfield wellsite.

11. The method of claim 1 comprising adjusting the positioning of the aerial mobile communication vehicle to maintain communication connectivity among the wellsite equipment, personnel, and wellsite sensors of the oilfield wellsite.

12. The method of claim 1 wherein the ad hoc/mesh network comprises a plurality of aerial mobile communication vehicles comprising the aerial mobile communication vehicle, and wherein aerial mobile communication vehicles of the plurality of aerial mobile communication vehicles can communicate with each other and with an access point including a communications router.

13. The method of claim 1 further comprising displaying the oilfield task to the first user as an augmented reality object via the set of smart glasses of the first communication device.

14. The method of claim 1 wherein the set of smart glasses of the first communication device is a first set of smart glasses, wherein the first communication device comprises a first smartphone, a first tablet, or a combination thereof, and wherein the second communication device comprises a second set of smart glasses, a second smartphone, a second tablet, or a combination thereof.

15. An aerial mobile communication vehicle, comprising:
a processor;
a monitoring device comprising a transceiver configured to communicate with measuring equipment of an oilfield wellsite; and
a memory including computer program code, wherein the processor, the monitoring device, the memory, and the computer program code are collectively operable to cause the aerial mobile communication vehicle to:
establish an ad hoc network at the oilfield wellsite, the ad hoc network configured to provide both unidirectional and bidirectional wireless communication solely along the ad hoc network between the measuring equipment, a control center associated with the oilfield wellsite, the aerial mobile communication vehicle, and a first communication device assigned to a first user associated with wellsite equipment in one sector of a plurality of sectors at the oilfield wellsite, wherein the first communication device comprises at least a set of smart glasses;
receive instructions over the ad hoc network for positioning the aerial mobile communication vehicle over the one sector;
monitor one or more operating parameters in the one sector by receiving data over the ad hoc network indicative of the operating parameters from the measuring equipment and the first communication device, wherein the operating parameters comprise one or more pressures, one or more temperatures, one or more chemical compositions, or any combination thereof related to the oilfield wellsite;
communicate the operating parameters over the ad hoc network to the control center;
receive an oilfield task from the control center for the first user to perform by operating the wellsite equipment, wherein the oilfield task was generated and assigned to the first user based on the operating parameters by:
displaying visual information from the set of smart glasses to a second user via a second communication device associated with the second user; and
receiving user input from the second communication device indicative of assignment of the oilfield task to the first user; and
provide the oilfield task to the first communication device.

16. The aerial mobile communication vehicle of claim 15 wherein the processor, the memory, and the computer program code are further collectively operable to cause the aerial mobile communication vehicle to:
communicate the data with an additional aerial mobile communication vehicle positioned over an additional one of the plurality of sectors;
provide control information to or receive control information from the additional aerial mobile communication vehicle at the oilfield wellsite; and
receive the control information from the control center.

17. The aerial mobile communication vehicle of claim 15 wherein the processor, the memory, and the computer program code are further collectively operable to cause the aerial mobile communication vehicle to:
receive content of parameters of the wellsite equipment in response to performance of the oilfield task;
provide the content to the control center;
receive an updated oilfield task for operating the wellsite equipment in response to the content from the control center; and
provide the updated oilfield task to the first communication device.

18. An apparatus in communication with an aerial mobile communication vehicle at an oilfield wellsite, comprising:
a processor; and
a memory including computer program code, wherein the processor, the memory, and the computer program code are collectively operable to cause the apparatus to:
establish an ad hoc network at the oilfield wellsite;
provide instructions, over the ad hoc network at the oilfield wellsite, for positioning the aerial mobile communication vehicle over a sector of the oilfield wellsite to the aerial mobile communication vehicle, wherein the ad hoc network is established by the aerial mobile communication vehicle and is configured to provide both unidirectional and bidirectional wireless communication between the apparatus, a first communication device comprising a set of smart glasses and associated with a first user at the oilfield wellsite, a control center, and the aerial mobile communication vehicle, and wherein the ad hoc network does not rely on a wireless communication infrastructure;
receive information from the control center, over the ad hoc network, regarding an oilfield task for the first user to perform by operating wellsite equipment in the sector, wherein the oilfield task is assigned to the first user by:

displaying visual information from the set of smart glasses to a second user via a second communication device associated with the second user; and receiving user input from the second communication device indicative of assignment of the oilfield task to the first user;

send the information to the aerial mobile communication vehicle, wherein the aerial mobile communication vehicle forwards the information to the first communication device; and receive one or more operating parameters of the wellsite equipment associated with the oilfield task via the first communication device and the aerial mobile communication vehicle.

19. The apparatus of claim 18 wherein:

the aerial mobile communication vehicle is a first aerial mobile communication vehicle;

the sector is a first sector; and the processor, the memory, and the computer program code are further collectively operable to cause the apparatus to:

provide instructions for positioning a second aerial mobile communication vehicle over a second sector of the oilfield wellsite;

provide control information to direct the second aerial mobile communication vehicle to communicate data between the control center and a third communication device within the second sector;

provide control information to direct at least one of the first and second aerial mobile communication vehicles to sense and/or monitor operating parameters in at least one of the first and second sectors; and receive the sensed and/or monitored operating parameters from at least one of the first and second aerial mobile communication vehicles, wherein the apparatus is located at the control center or within the first, second, or another aerial mobile communication vehicle.

20. The apparatus of claim 18 wherein the first communication device is associated with the wellsite equipment in the sector, and wherein the processor, the memory, and the computer program code are further collectively operable to cause the apparatus to:

assign an updated oilfield task for operating the wellsite equipment based on the operating parameters; and provide the updated oilfield task to the aerial mobile communication vehicle.

\* \* \* \* \*